(12) United States Patent  
Gess

(10) Patent No.: US 8,192,120 B1
(45) Date of Patent: Jun. 5, 2012

(54) SELF-SEALING INFLATABLE DUNNAGE BAG

(76) Inventor: Larry C. Gess, Palmyra, WI (US)

(*) Notice: Subject to any disclaimer, the term of this patent is extended or adjusted under 35 U.S.C. 154(b) by 0 days.

(21) Appl. No.: 13/282,679

(22) Filed: Oct. 27, 2011

Related U.S. Application Data

(60) Provisional application No. 61/408,588, filed on Oct. 30, 2010.

(51) Int. Cl.
*B60P 7/08* (2006.01)
(52) U.S. Cl. ...................................... 410/119; 410/125
(58) Field of Classification Search .................. 410/118, 410/119, 128, 87, 125, 155; 206/522, 593; 383/3, 109, 58; 428/35.2, 178
See application file for complete search history.

(56) References Cited

U.S. PATENT DOCUMENTS

| 7,168,567 | B2 | 1/2007 | Peper et al. |
| 7,361,397 | B2 | 4/2008 | Perkins et al. |
| 7,909,554 | B2 * | 3/2011 | Keenan et al. ............... 410/119 |

* cited by examiner

*Primary Examiner* — Stephen Gordon
(74) *Attorney, Agent, or Firm* — Donald J. Ersler

(57) ABSTRACT

A plurality of self-sealing inflatable dunnage bags are formed on a continuous strip. The continuous strip includes a first bag layer, a second bag layer and an air channel layer. A bag perimeter sealing line is formed between the first and second bag layers for each bag cavity. At least one air flow sealing line extends inward into the bag cavity. An air flow channel is formed between the second and third bag layers. An air pocket is located in the air channel layer for each bag cavity. An air bag opening is formed through the second bag layer in the air pocket. Air flows through the air flow channel into the air pocket and through the air bag opening to inflate each bag cavity.

20 Claims, 6 Drawing Sheets

SELF-SEALING INFLATABLE DUNNAGE BAG

CROSS-REFERENCES TO RELATED APPLICATIONS

This is a nonprovisional patent application taking priority from provisional application No. 61/408,588 filed on Oct. 30, 2010.

BACKGROUND OF THE INVENTION

1. Field of the Invention

The present invention relates generally to the manufacture of inflatable packaging and more specifically to a self-sealing inflatable dunnage bag, which does not require sealing after inflation or a complex inflation apparatus.

2. Discussion of the Prior Art

It is well known in the art of inflatable packaging to fill dunnage bags with air and then heat seal the packing bags to retain the air therein. However, the inflatable dunnage bag is typically complicated or the apparatus used to produce the inflatable dunnage bags with air is also complicated. A complicated inflatable dunnage bag will require complicated machinery to fill thereof. A complicated inflatable packaging machine will not always produce a consistent product, due to the complexity of the machine and also variations in the sheet material used to produce the inflatable packaging.

Typically, a manufacturer of inflatable packaging provides a customer with inflatable packaging machines at no cost and sells the inflatable packaging to the customer. Any problems with the inflatable packaging machines is the manufacturer's responsibility and expense. It is to the manufacturer's advantage to have the simplest and most inexpensive inflatable packaging machines to produce the inflatable packaging. Further, having inexpensive inflatable packaging machinery makes it possible to sell the inflatable packaging to smaller companies.

U.S. Pat. No. 7,168,567 to Peper et al. discloses an inflatable packaging system. U.S. Pat. No. 7,361,397 to Perkins et al. discloses a film material for air-filled packing cushions.

Accordingly, there is a clearly felt need in the art for a self-sealing inflatable dunnage bag, which does not require sealing after inflation or a complex inflation apparatus.

SUMMARY OF THE INVENTION

The present invention provides a self-sealing inflatable dunnage bag, which does not require sealing after inflation or a complex inflation apparatus. A plurality of self-sealing inflatable dunnage bags are formed on a continuous strip. The continuous strip includes a first bag layer, a second bag layer and an air channel layer. The first bag layer, the second bag layer and the air channel layer are preferably fabricated from a flexible transparent plastic sheet material. A bag perimeter sealing line is formed between the first and second bag layers to form a bag cavity. The bag perimeter sealing line preferably includes a first bag edge line, a second bag edge line, a first bag end line and a second bag end line. The first bag edge line is located adjacent the first edge of the first and second bag layers. A first edge of the first bag layer is sealed to a first edge of the second bag layer. A channel seal line is preferably formed between the first edge and the first bag edge line. At least one air flow sealing line extends inward from the first bag edge line into the bag cavity. Each air flow sealing line is preferably terminated with an air flow dot. The air flow dot is preferably round, but could be any other suitable geometric shape.

An air flow channel is formed between the second and third bag layers. The air flow channel preferably includes sealing a first edge of the air channel layer to the first edge of the second bag layer; sealing a second edge of the air channel layer to the second bag layer; and sealing an air pocket between the second bag layer and the air channel layer. The air pocket is located between the first and second edges of the air channel layer. The air pocket includes a first pocket edge line, a second pocket edge line, a first end line and a second end line. The first pocket edge line extends the length of the continuous strip. The first pocket edge line is interrupted with an air passage to allow air flow into the air pocket. An air bag opening, such as a slit or any other suitable opening is formed through the second bag layer. The air bag opening is located in the air pocket.

The first bag layer, the second bag layer and the air channel layer are attached to each other with heat sealing, glue, adhesive or any other suitable bonding agent or method. An end of the continuous strip is pulled over the inflation pin, such that the inflation pin is inserted between the second bag layer and the air channel layer; and between the first edge of the air channel layer and the first pocket edge line. The continuous strip is pulled through the inflation apparatus, which forces air through the air passage of each air pocket; through the air bag opening; and into each bag cavity. Inflation of the bag cavity causes the air pocket layer to seal against the second bag layer in the area of the at least one air flow sealing line. Air is prevented from escaping the bag cavity through the air pocket, because the at least one air flow sealing line acts as a check valve to prevent air flow out of the air passage.

An apparatus for inflating a strip of self-sealing inflatable dunnage bags (inflation apparatus) preferably includes an apparatus frame, at least one guide roller, a guide rail, an inflation pin and a pair of pinch rollers. The apparatus frame includes a first support wall, a second support wall, a base support and a top support panel. The first support wall is attached to a first end of the base support and the top support panel and the second support wall is attached to a second end of the base support and the top support panel. The at least one guide roller provides support for feeding a continuous strip of self-sealing inflatable dunnage bags into the guide rail. A strip guide includes a semi-circular inner perimeter, which is concentric with a top guide roller. The continuous strip is pulled through the guide rail.

The inflation pin is inserted into an end of the continuous strip, between the second bag layer and the air channel layer. The continuous strip is pulled and inserted between the pair of pinch rollers. The pinch rollers are rotated with a motor. The inflation pin includes an inflation opening. An air compressor is connected to the inflation tube, such that compressed air flows through the inflation opening. The pinch rollers are rotated by the motor and the source of compressed air is activated to inflate a plurality of bag cavities in the continuous strip.

Accordingly, it is an object of the present invention to provide a self-sealing inflatable dunnage bag, which does not require sealing after inflation.

Finally, it is another object of the present invention to provide a self-sealing inflatable dunnage bag, which does not require a complex inflation apparatus to fill the dunnage bag.

These and additional objects, advantages, features and benefits of the present invention will become apparent from the following specification.

DETAILED DESCRIPTION OF THE PREFERRED EMBODIMENTS

Figure 4A:
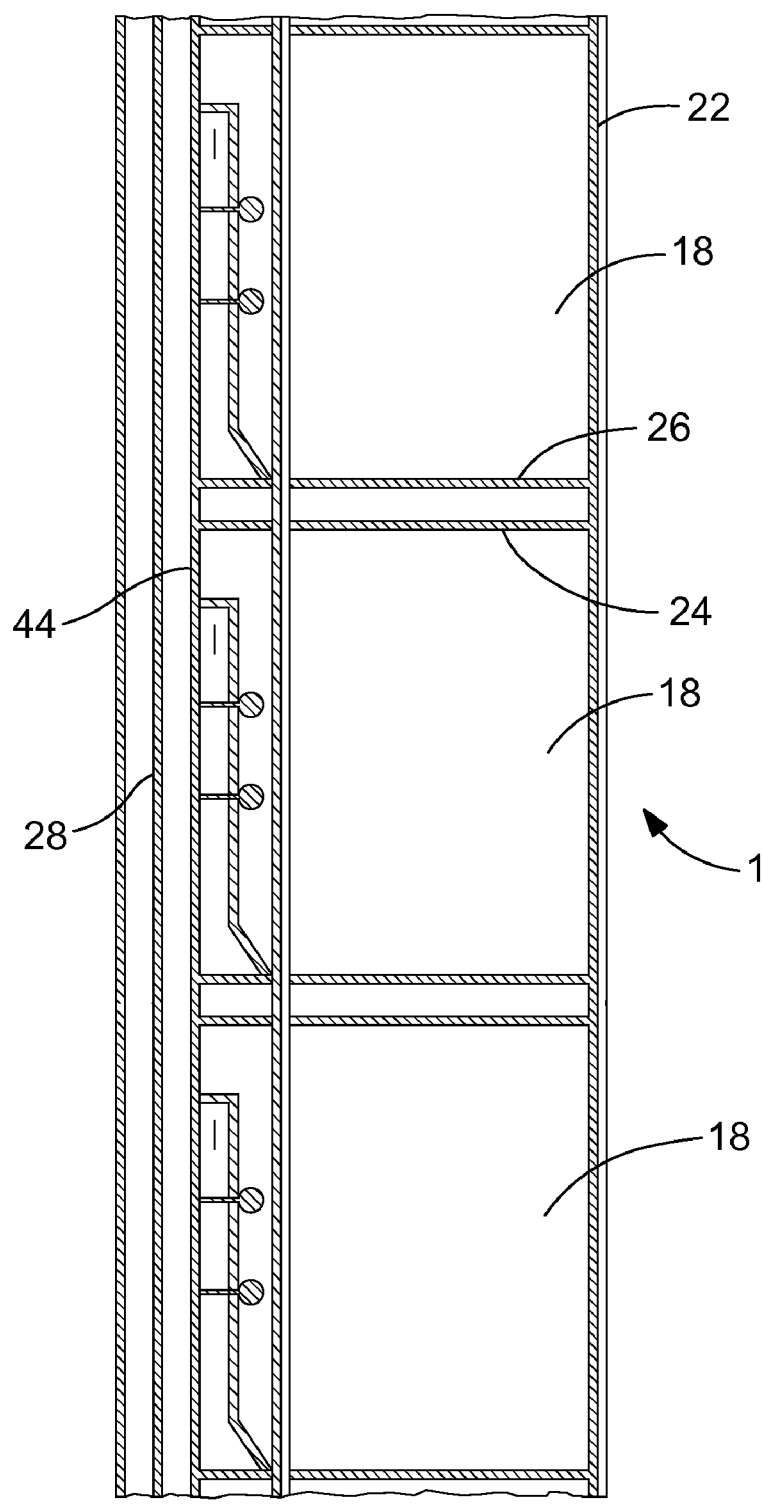
FIG. 4a is a top view of a portion of a continuous strip of self-sealing inflatable dunnage bags in accordance with the present invention.

With reference now to the drawings, and particularly to FIG. 4a, there is shown a top view of a continuous strip of self-sealing inflatable dunnage bags 1. With reference to FIGS. 1-5, the continuous strip 1 includes a first bag layer 10, a second bag layer 12 and an air channel layer 14. The first bag layer 10, the second bag layer 12 and the air channel layer 14 are preferably fabricated from a transparent stretchable plastic sheet material. A bag sealing perimeter 16 is formed between the first and second bag layers to form a bag cavity 18. The bag perimeter line 16 preferably includes a first bag edge line 20, a second bag edge line 22, a first bag end line 24 and a second bag end line 26. An air channel seal line 28 is formed between a first edge 30 of the first and second layers and the first bag edge line 20. The channel seal line 28 extends the length of the continuous strip 1. The first bag layer 10 is sealed to the second bag layer 12 at the first edge 30 thereof.

At least one air flow sealing line 32 extends inward from the first bag edge line 20 into the bag cavity 18. It is preferable to have two air flow sealing lines 32 as shown. Each air flow sealing line 32 is terminated with an air flow dot 34. A seal is formed between the first and second bag layers in the area of the air flow dot 34. The air flow dot 34 is preferably round, but could be any other suitable geometric shape. A width of the air flow dot 34 is at least five times the width of the air flow sealing line 32. An air flow channel 36 is formed between the second and third bag layers. The air flow channel 36 preferably includes sealing a first edge 38 of the air channel layer 14 to the first edge 30 of the second bag layer 12; sealing a second edge 40 of the air channel layer 14 to the second bag layer 12; and sealing an air pocket 42 between the second bag layer 12 and the air channel layer 14. The air pocket 42 is located between the first and second edges of the air channel layer 14. The air pocket 42 preferably includes a first pocket edge line 44, a second pocket edge line 46, a first end line 48 and a second end line 50. The first pocket edge line 44 preferably extends the length of the continuous strip 1. An angled connection line 47 extends from an end of the second pocket edge line 46 to an end of the second end line 50. However, the air pocket 42 may have any other appropriate shape. The first pocket edge line 44 is interrupted with an air passage 52 to allow air flow into the air pocket 42. An air bag opening 54, such as a slit or any other suitable opening is formed through the second bag layer 12. The air bag opening 54 is formed through the second bag layer 12 inside the air pocket 42.

Figure 9:
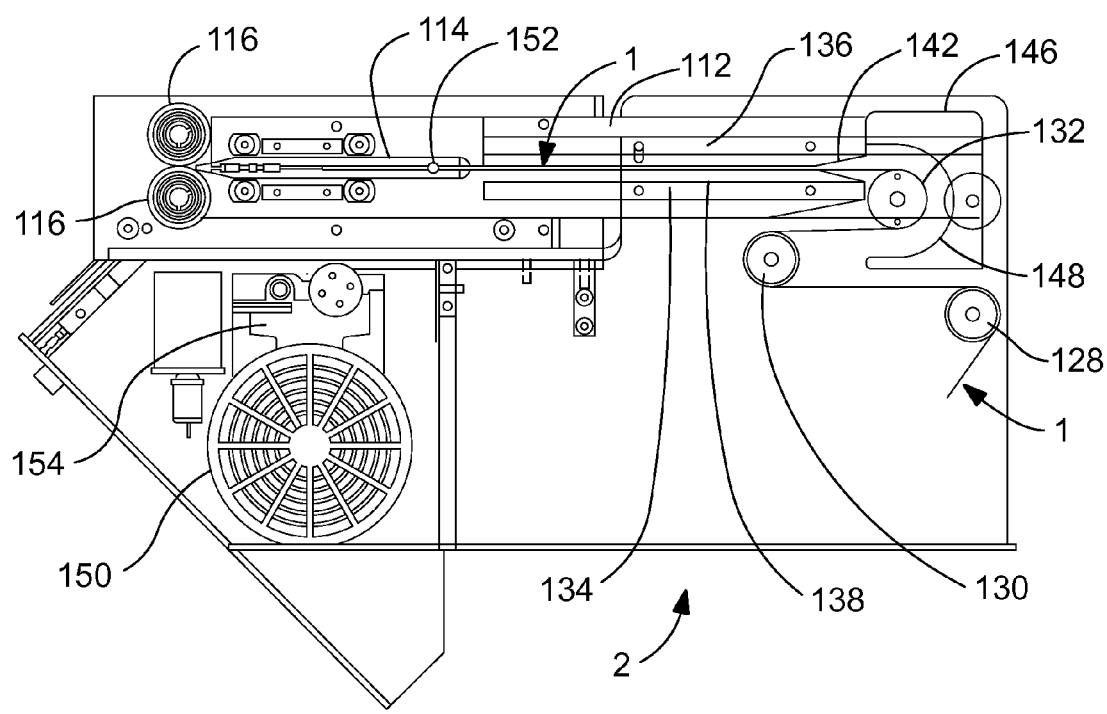
FIG. 9 is a cross-sectional view of an apparatus for inflating a strip of self-sealing inflatable dunnage bags cut through FIG. 8 in accordance with the present invention.

The edges and lines of the first bag layer 10, the second bag layer 12 and the air channel layer 14 are attached to each other with heat sealing, glue, ultraviolet cured glue, adhesive, ultraviolet cured adhesive or any other suitable bonding agent or method. With reference to FIG. 9, an inflation pin 114 of an inflation apparatus 2 or the like is inserted into an end of the continuous strip 1, between the second bag layer 12 and the air channel layer 14; and between the first edge 38 of the air channel layer 14 and the first pocket edge line 44. The continuous strip 1 is pulled through the inflation apparatus 2, which forces air through the air passage 52 of each air pocket 42; through the air bag opening 54; and into the bag cavity 18.

Figure 1:
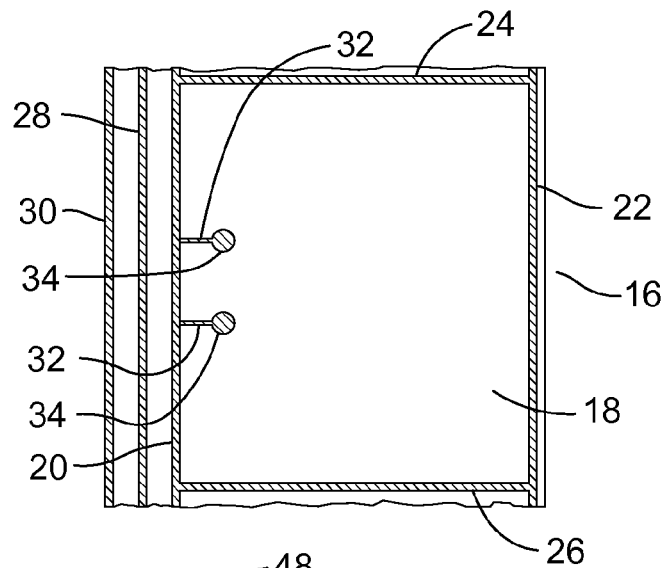
FIG. 1 is a top view of a first bag layer attached to a second bag layer of a self-sealing inflatable dunnage bag in accordance with the present invention.
Figure 2:
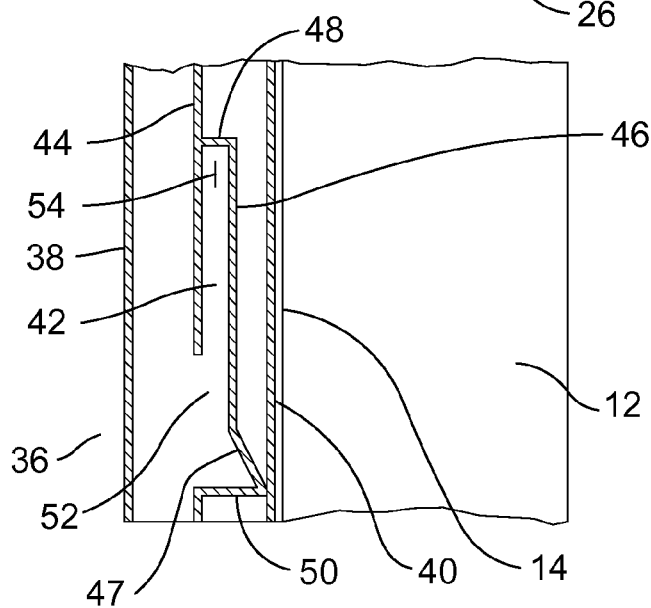
FIG. 2 is a top view of a second bag layer attached to a air channel layer of a self-sealing inflatable dunnage bag in accordance with the present invention.
Figure 3:
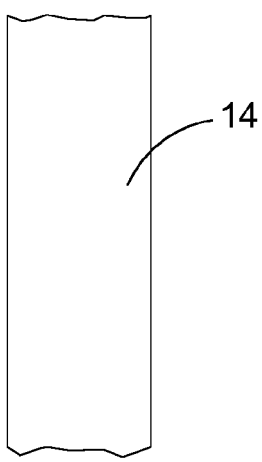
FIG. 3 is a top view of an air channel layer of a self-sealing inflatable dunnage bag in accordance with the present invention.
Figure 4:
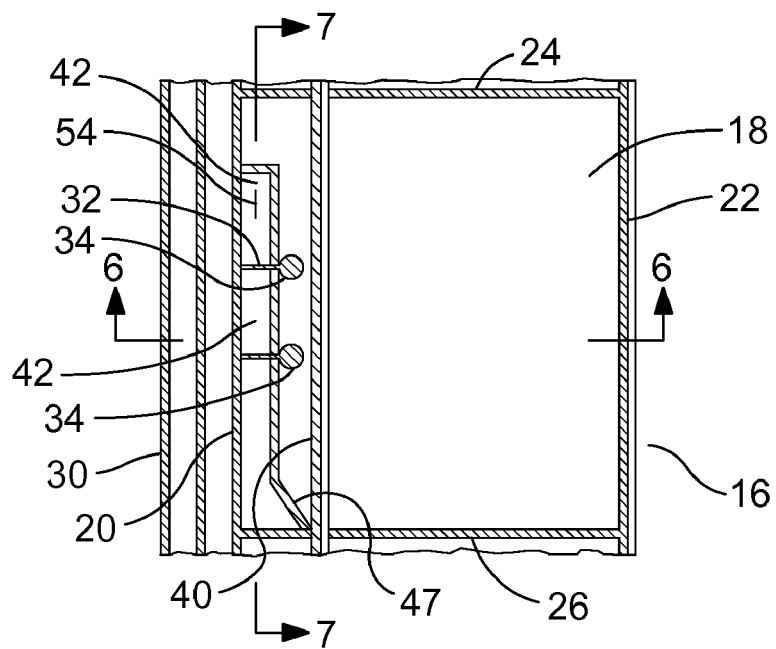
FIG. 4 is a top view of a self-sealing inflatable dunnage bag in accordance with the present invention.
Figure 5:
FIG. 5 is an end view of an uninflated self-sealing inflatable dunnage bag in accordance with the present invention.
Figure 6:
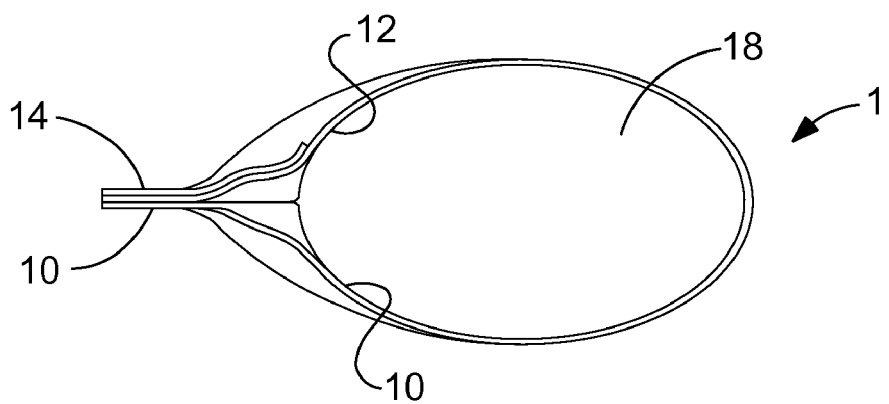
FIG. 6 is an end cross-sectional view of an inflated self-sealing inflatable dunnage bag cut through FIG. 4 in accordance with the present invention.
Figure 7:
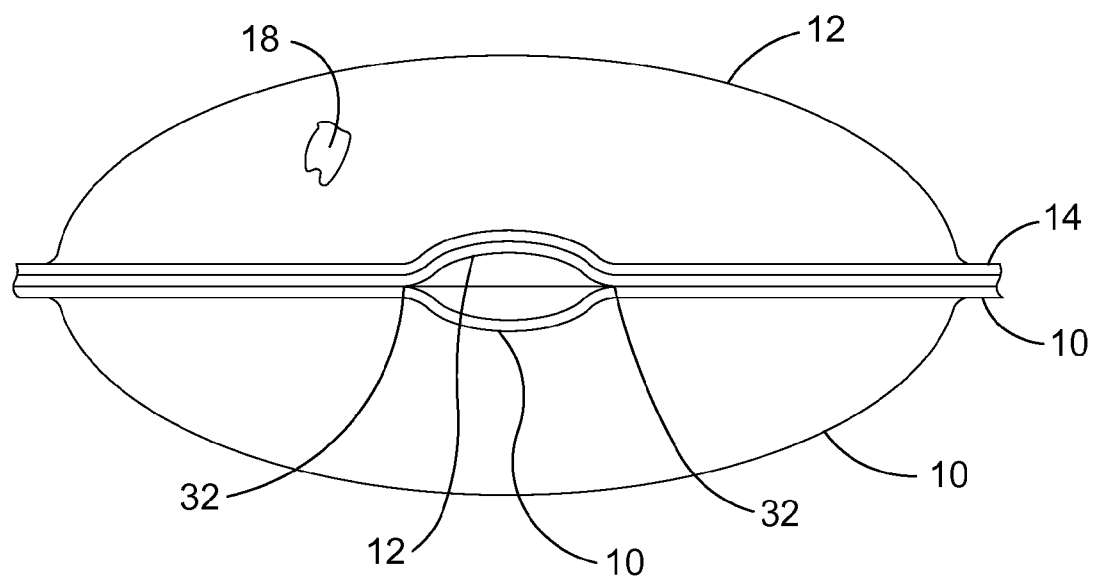
FIG. 7 is a side cross-sectional view of an inflated self-sealing inflatable dunnage bag cut through FIG. 4 in accordance with the present invention.

With reference to FIGS. 6-7, inflation of the bag cavity 18 causes the air pocket layer 14 to seal against the second bag layer 12 in the area of the at least one air flow sealing line 32. Air is prevented from escaping the bag cavity 18 through the air pocket 42, because the at least one air flow sealing line 32 acts as a check valve to prevent air flow out of the air passage 42.

Figure 8:
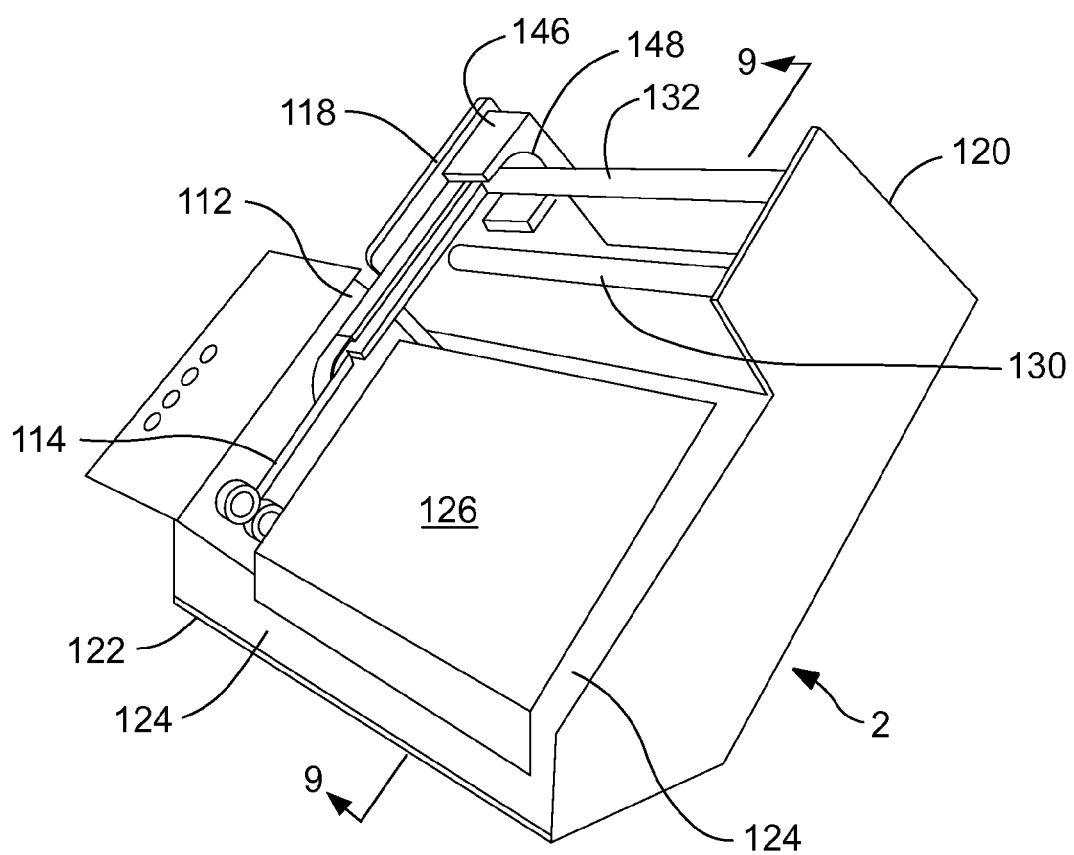
FIG. 8 is a perspective view of an apparatus for inflating a continuous strip of self-sealing inflatable dunnage bags in accordance with the present invention.

With reference to FIGS. 8-9, an apparatus for inflating a strip of self-sealing inflatable dunnage bags (inflation apparatus) 2 includes an apparatus frame 110, at least one guide roller, a guide rail 112, an inflation pin 114 and a pair of pinch rollers 116. The apparatus frame 110 includes a first support wall 118, a second support wall 120, a base support 122 and a top support panel 124. The first support wall 118 is attached to a first end of the base support 122 and the top support panel 124 and the second support wall 120 is attached to a second end of the base support 122 and the top support panel 124. A film support panel 126 is preferably attached to a top of the top support panel 124. A first guide roller 128, a second guide roller 130 and a third guide roller 132 are retained between the first and second support walls. The first, second and third guide rollers provide support for feeding the continuous strip 1 into the guide rail 112.

The guide rail 112 includes a lower guide member 134 and an upper guide member 136. A gap 138 is maintained between the lower and upper guide members to provide clearance for the continuous strip 1. An entrance to the lower guide member 134 includes a lower entrance chamfer 140 and an entrance to the upper guide member 136 includes an upper entrance chamfer 142. A strip guide 146 includes a semi-circular inner perimeter 148, which is concentric with the third guide roller 132 to provide feeding guidance to the continuous strip 1.

An end of the continuous strip 1 is pulled over the inflation pin 114, such that the inflation pin 114 is inserted between the second bag layer 12 and the air channel layer 14; and between the first edge 38 of the air channel layer 14 and the first pocket edge line 44. The continuous strip 1 is pulled and inserted between the pair of pinch rollers 116. The pinch rollers 116 are rotated with a motor 150, which pulls the continuous strip 1 through the inflation apparatus 2. The inflation pin 114 includes at least one inflation opening 152. An air compressor 154 is driven by the motor 150. An output of the air compressor 154 is connected to the inflation tube 114, such that compressed air flows through the inflation opening 152. The pinch rollers 116 are rotated by the motor 150 and the air compressor 154 is activated to inflate a plurality of bag cavities 18 in the continuous strip 1 through the plurality of air passages 52.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A strip of self-sealing inflatable dunnage bags, comprising:
   a first bag layer;
   a second bag layer is attached to said first bag layer to form a plurality of bag cavities; and
   an air channel layer is attached to said second layer to form an air pocket for each bag cavity, said air pocket is located between a first edge and a second edge of said air channel layer, said air pocket includes a first pocket edge line that extends a length of said strip, an air passage is formed through said first pocket edge line, an air bag opening is formed through said second bag layer and located in said air pocket.

2. The strip of self-sealing inflatable dunnage bags of claim 1, further comprising:
   at least one air flow sealing line extends from a perimeter of each bag cavity adjacent said air pocket.

3. The strip of self-sealing inflatable dunnage bags of claim 2, further comprising:
   said at least one air flow sealing line is terminated with at least one air flow dot, said first bag layer is sealed to said second bag layer in the area of said air flow dot.

4. The strip of self-sealing inflatable dunnage bags of claim 3 wherein:
   said at least one air flow dot having a round perimeter.

5. The strip of self-sealing inflatable dunnage bags of claim 2 wherein:
   a channel seal line is located between a first edge of said first and second layers and said perimeter of said bag cavity.

6. The strip of self-sealing inflatable dunnage bags of claim 1 wherein:
   said bag cavity includes a first bag edge line, a second bag edge line, a first bag end line and a second bag end line.

7. The strip of self-sealing inflatable dunnage bags of claim 1 wherein:
   said air pocket includes a first bag end line, a second pocket edge line, a first end line and a second end line.

8. The strip of self-sealing inflatable dunnage bags of claim 7 wherein:
   said air passage is formed adjacent said second end line, said air bag opening is formed adjacent said first end line.

9. A strip of self-sealing inflatable dunnage bags, comprising:
   a first bag layer;
   a second bag layer is attached to said first bag layer to form a plurality of bag cavities, at least one air flow sealing line extending into each one of said plurality of bag cavities, each one of said bag cavities includes a first bag edge line; and
   an air channel layer is attached to said second layer to form an air pocket for each bag cavity, said air pocket is located between a first edge of said second bag layer and said first bag edge line of said bag cavity, said air pocket includes a first pocket edge line that extends a length of said strip, an air passage is formed through said first pocket edge line, an air bag opening is formed through said second bag layer and located in said air pocket.

10. The strip of self-sealing inflatable dunnage bags of claim 9, further comprising:
    each one of said at least one air flow sealing line is terminated with an air flow dot, said first bag layer is sealed to said second bag layer in the area of said air flow dot.

11. The strip of self-sealing inflatable dunnage bags of claim 9 wherein:
    a channel seal line is located between a first edge of said first and second layers and said first bag edge line.

12. The strip of self-sealing inflatable dunnage bags of claim 9 wherein:
    said bag cavity includes said first bag edge line, a second bag edge line, a first bag end line and a second bag end line.

13. The strip of self-sealing inflatable dunnage bags of claim 9 wherein:
    said air pocket includes said first pocket edge line, a second pocket edge line, a first end line and a second end line.

14. The strip of self-sealing inflatable dunnage bags of claim 13 wherein:
    said air passage is formed adjacent said second end line, said air bag opening is formed adjacent said first end line.

15. A strip of self-sealing inflatable dunnage bags, comprising:
    a first bag layer;
    a second bag layer is attached to said first bag layer to form a plurality of bag cavities, each one of said bag cavities includes a first bag edge line; and
    an air channel layer is attached to said second layer to form an air pocket for each bag cavity, said air pocket is located between a first edge of said second bag layer and said first bag edge line of said bag cavity, said air pocket includes a first pocket edge line that extends a length of said strip, an air passage is formed through said first pocket edge line, an air bag opening is formed through said second bag layer and located in said air pocket, wherein air flows between said second bag layer and said air channel layer, the air flows through said air passage and through said air bag opening to fill said bag cavity.

16. The strip of self-sealing inflatable dunnage bags of claim 15, further comprising:
    at least one air flow sealing line,
    each one of said at least one air flow sealing line is terminated with an air flow dot, said first bag layer is sealed to said second bag layer in the area of said air flow dot.

17. The strip of self-sealing inflatable dunnage bags of claim 15 wherein:
    a channel seal line is located between a first edge of said first and second layers and said first bag edge line.

18. The strip of self-sealing inflatable dunnage bags of claim 15 wherein:
    said bag cavity includes said first bag edge line, a second bag edge line, a first bag end line and a second bag end line.

19. The strip of self-sealing inflatable dunnage bags of claim 15 wherein:
    said air pocket includes said first pocket edge line, a second pocket edge line, a first end line and a second end line.

20. The strip of self-sealing inflatable dunnage bags of claim 19 wherein:
    said air passage is formed adjacent said second end line, said air bag opening is formed adjacent said first end line.

* * * * *